United States Patent Office 3,049,150
Patented Aug. 14, 1962

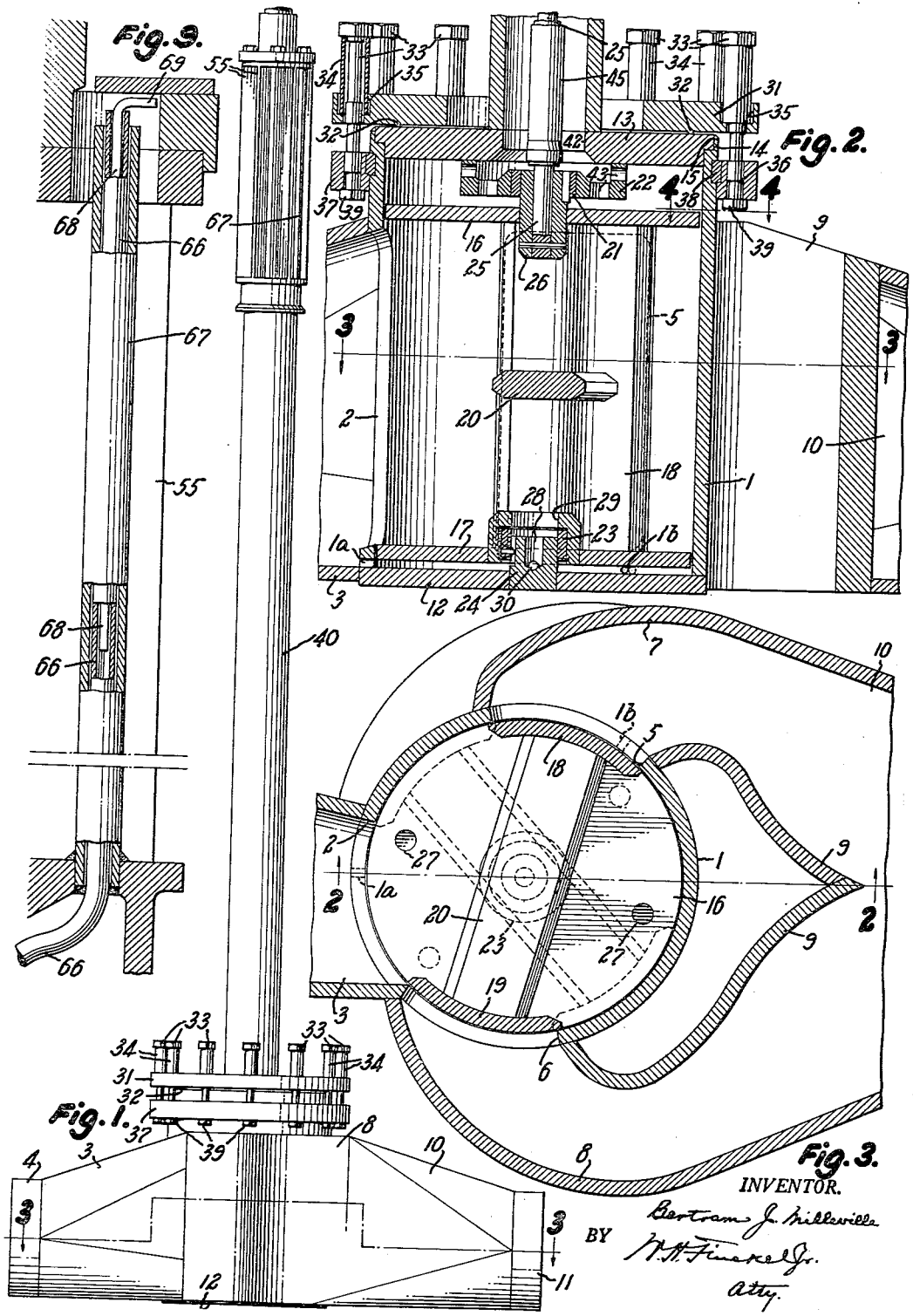

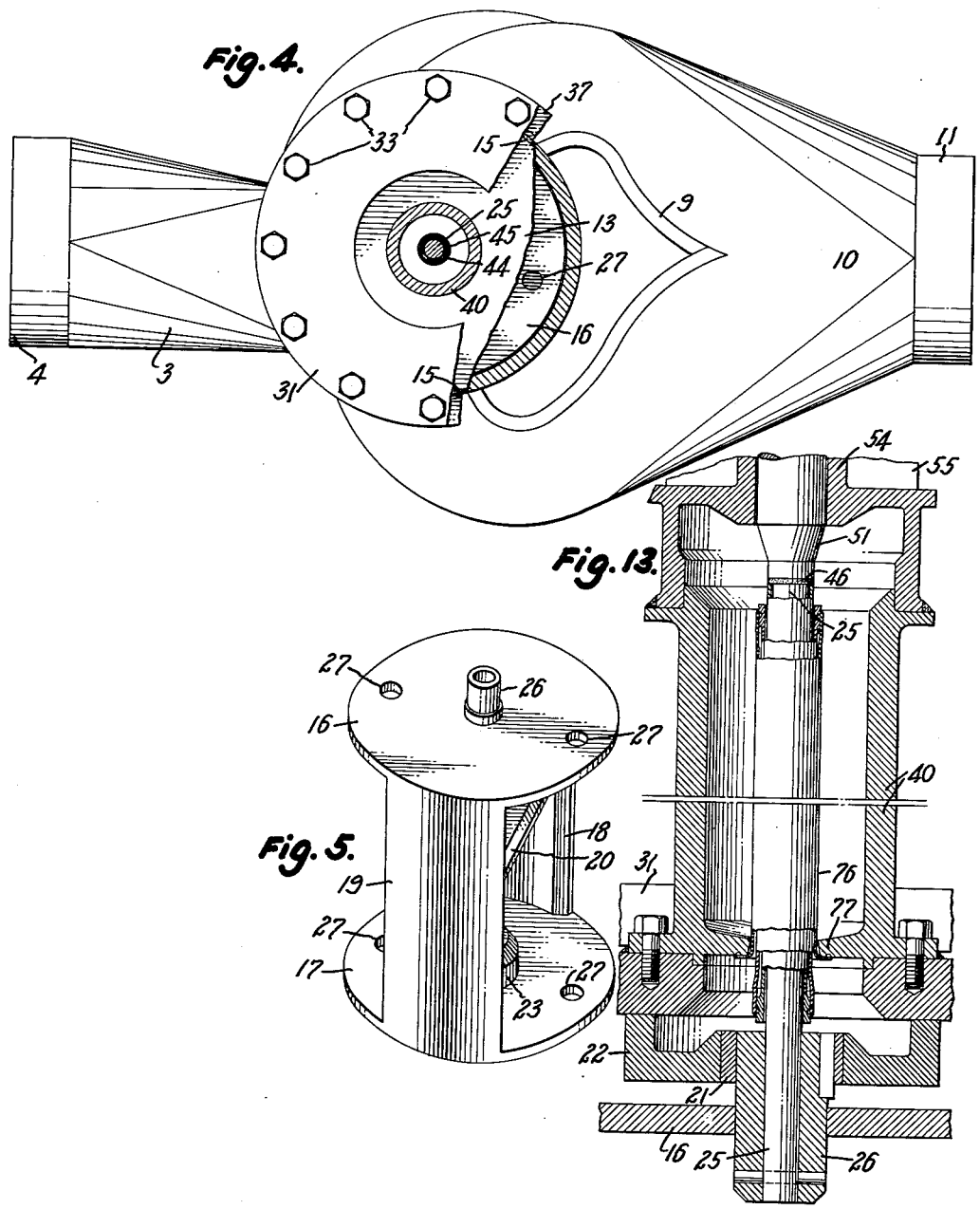

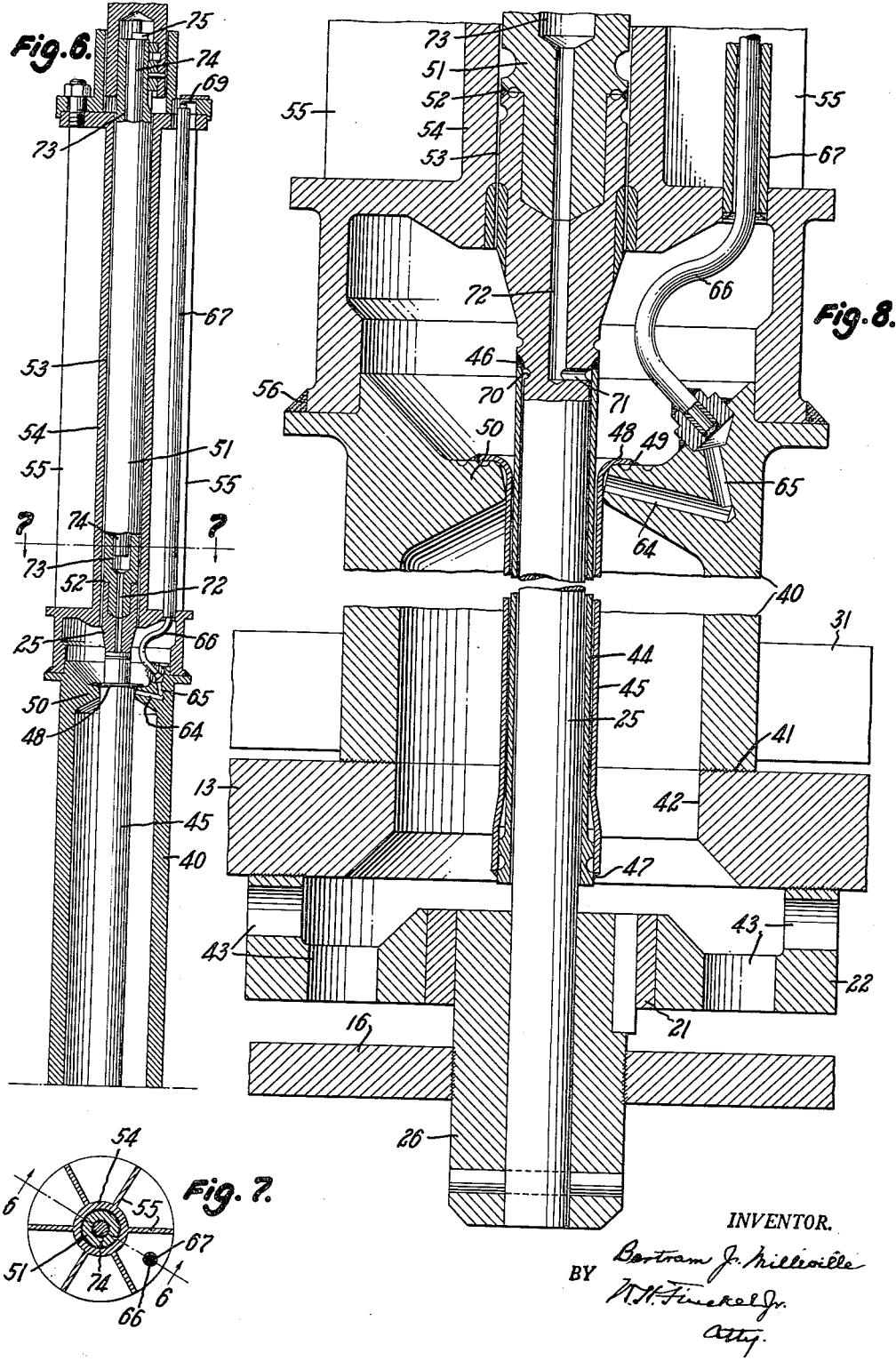

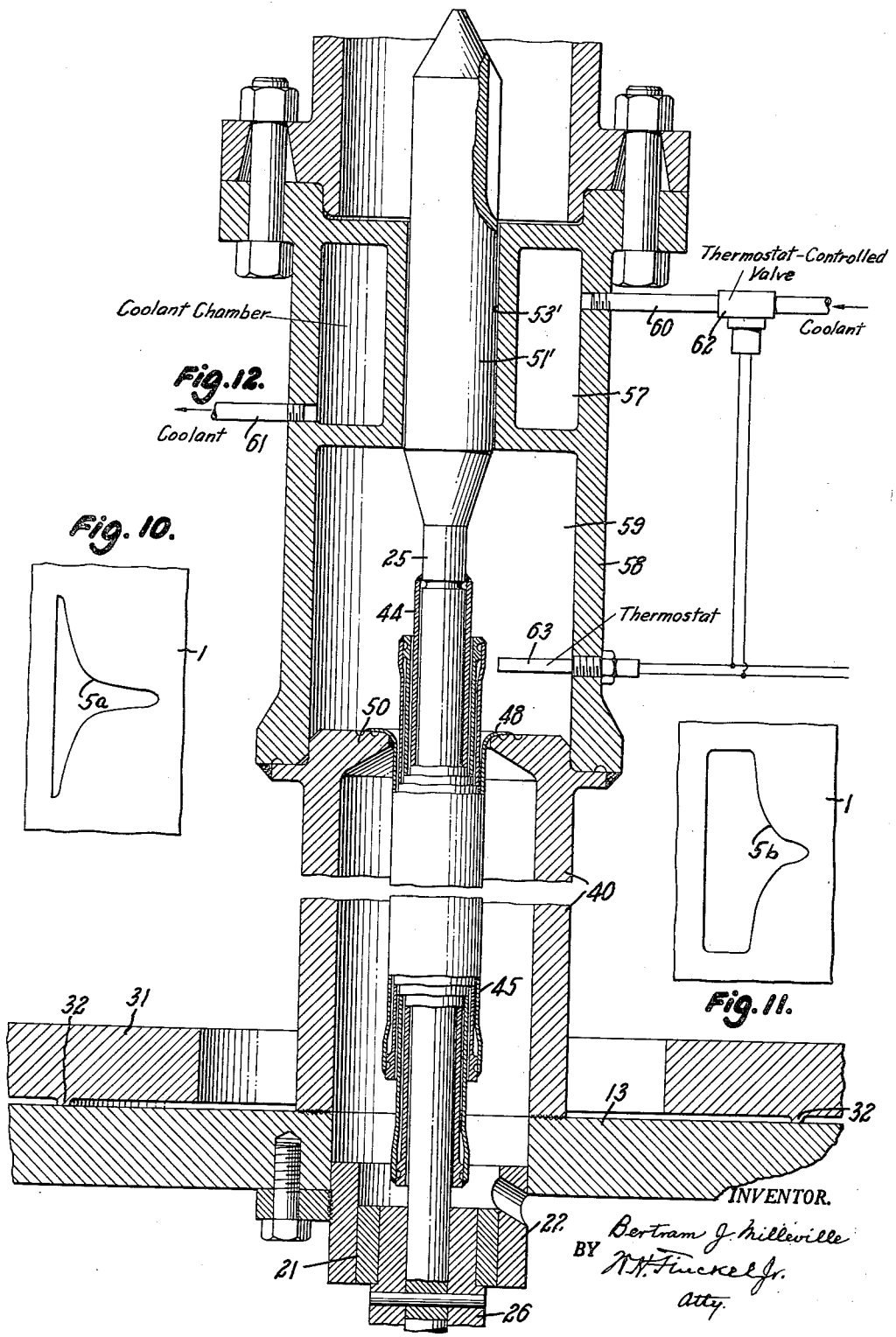

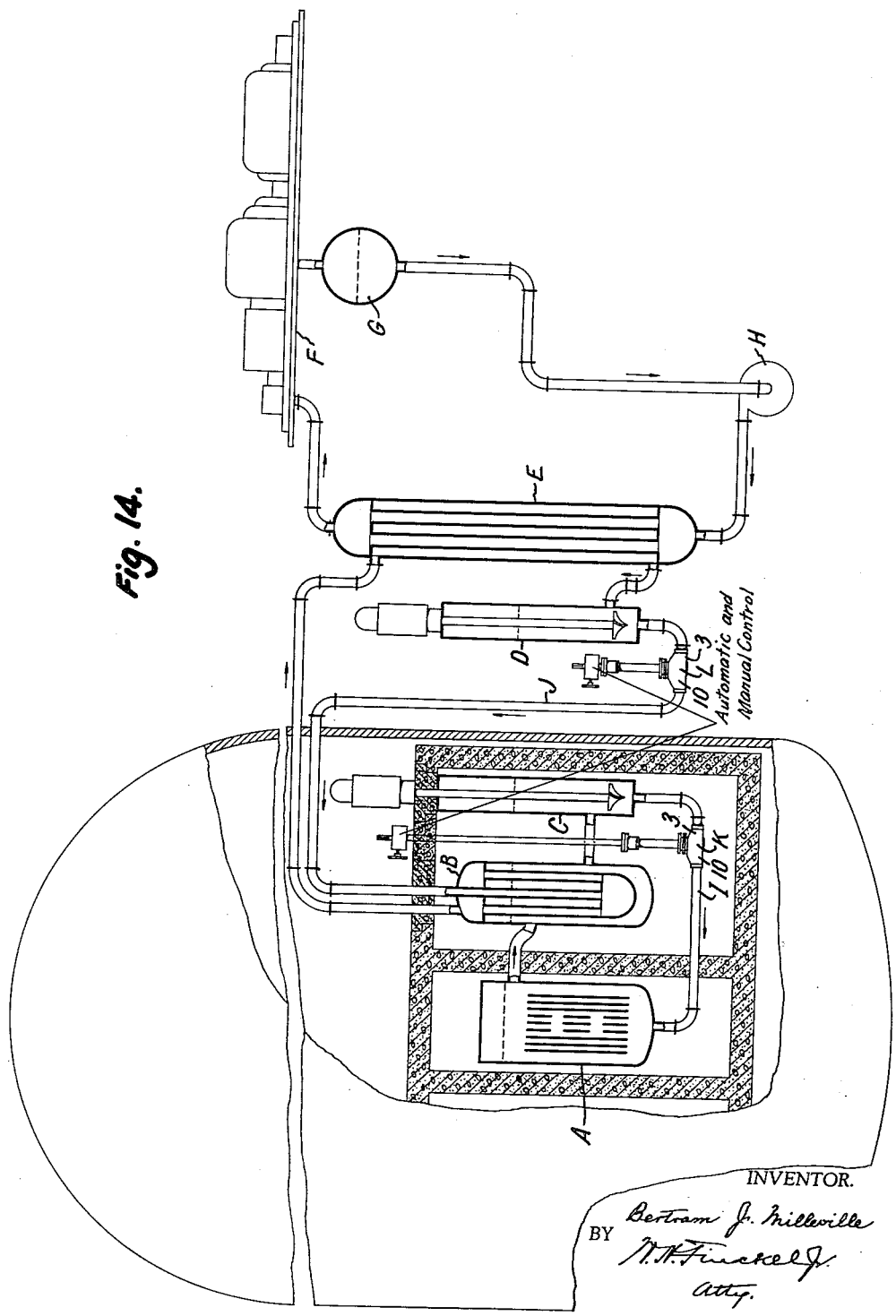

3,049,150
FLUID FLOW CONTROL DEVICE
Bertram J. Milleville, Wadsworth, Ohio, assignor, by mesne assignments, to the United States of America as represented by the United States Atomic Energy Commission
Filed May 4, 1959, Ser. No. 810,915
1 Claim. (Cl. 137—625.32)

This invention relates to fluid control devices and particularly to valves of the rotary fluid flow throttling element type particularly adapted for the efficient control of fluids of high pressure or high temperature, or high pressure and temperature, such as are presently encountered in nuclear reactor power plants employing liquid metal (e.g. sodium) as the coolant, having in mind the fact that in such plants the coolant may reach temperatures of the order of 1200° F., for which service valves of conventional commercial design are not suitable and not readily adaptable.

The invention relates, also, to a flow control device or valve having structural features of general application, particularly where throttling, rather than a mere on-off control, of flow of fluid is desired, and in which a balance of pressure within the confines of the device is a consideration.

Further, the invention embodies means of rather broad application for providing a zero-leakage fluid seal, between a stationary element and a rotary element, such as the bonnet and the shaft or stem of the fluid flow control element of a valve, respectively, as a substitute for bellows seals, packings and glands of known types, none of which have proven to be entirely satisfactory in installations requiring zero-leakage operation in the presence of high temperatures or high temperatures and pressures.

Having reference to the control of the flow of coolant in nuclear reactor power plants, for which the invention is particularly appropriate, it will be appreciated that such control is primarily of the throttling type wherein, during operation of the plant, some appreciable flow of the coolant must always be present, and the valve of the invention is designed to afford an efficient control of this type and at the same time to insure in an unfailing manner either automatic or manual throttling setting of the fluid flow control element of the valve consonant with that flow of the coolant which is determined to be necessary for effective functioning of the plant, and to guard against leakage of coolant from the valve while providing for maintenance within the interior of the body and bonnet of the valve, and around those portions of the operating shaft or stem thereof subjected thereto, temperatures and pressures substantially approximating those of the controlled coolant.

As above indicated, in the application of the device of the invention in nuclear installations, the overall design and the construction details are directed toward meeting the exacting requirements of the specific service. Liquid metal is circulated as a coolant in large volume through the reactor core and heat exchangers and serves to carry the enormous quantities of heat generated in the core out of the reactor to where it can be utilized to generate steam which in turn will drive the power-producing turbines.

For economic reasons this operation involves heating the coolant to very high temperatures (for example 1200° F. is anticipated in future installations of power reactors). Such high temperatures in turn create structural problems related to the loss of strength of materials and the thermal stresses resulting from both static and dynamic temperature differentials.

In order to retain some degree of control of the stresses resulting from dynamic temperature differentials, commonly referred to as thermal shock stresses, it is expedient to modulate the flow of coolant in response to sensed or anticipated temperature fluctuations. Thus if a drop in temperature is expected or sensed, reducing the flow of coolant would tend to restore the temperature to its original level or even prevent the drop, and, conversely, an increased flow of coolant would counteract a tendency for temperature to increase.

It is possible to achieve this control by varying the speed of the coolant circulating pump. This has economic limitations in that provision of variable speed control on a pump of this capacity is costly and, also, the mechanical inertia of the pump and the fluid tend to make this means of control comparatively sluggish.

Another expedient is to utilize the principle of eddy current breaking, i.e., applying the squirrel-cage motor principle, in reverse, to the motion of coolants (liquid metals are good electrical conductors) through a pipe. This is ideal from the standpoint of responsiveness of control, but it is also costly, from the standpoint of capital investment as well as cost of operation.

The throttling device of this invention will, it is believed, offer the most practical solution to the problem by virtue of its simplicity of construction and operation, and its reasonable overall cost. Because of its use of fluid force balancing and a small angular rotation for full rangeability from wide open to fully closed, its response can be made extremely fast with a very modestly powered operator. It is capable, moreover, of adequate rangeability in its throttling characteristics to suit the extreme requirements (typically a 20:1 ratio of flow wide open with minimum pressure drop, to flow in closed position with virtually full pump differential across the device) of the application. Means will also be provided for over-riding manual operation.

The zero-leakage seal of this invention hereinabove referred to interposed between the operating shaft or stem and the valve bonnet comprises torsion tube means having end edge connection with the shaft and bonnet, respectively, of such a nature (welding being preferred) as to provide total continuous wall closure of the pressure vessel. The nature of the torsion tube means, and the limited angular movement of the shaft, as will be explained hereinafter, make possible repeated torsional twisting of such tube means without danger of rupture of such means or destruction of their connection (welds) with the shaft and bonnet.

In the preferred embodiment of this zero-leakage seal at least two torsion tubes are employed in telescoped association with clearance between their adjacent surfaces, the inner tube telescoping the shaft with proper clearance and having one of its ends welded thereto, and the outer tube having one of its ends welded to the free end of the inner tube and its other end welded to the bonnet.

Thus, when the actuating shaft is rotated to actuate the control element of the device the rotational strain is divided between the torsion tubes in inverse proportion to their rigidity. Considering the device as hereinafter described with the control element at mid-position and with zero stress in the torsion tubes at such mid-position, angular motion of approximately 30° will be sufficient to move the control element to full open or full closed position. Since the designer may choose any length of tube that may be required, it is possible to achieve the total 30° torsional strain within any required stress limitation.

Since torsional rigidity is proportional to diameter, the flexibility of the outer tube will be less than that of the inner tube. However, the stresses in both tubes can be approximately equalized by making the wall thicknesses inversely proportional to mean diameter. This has the advantage of assuring that, assuming uniform temperature throughout, at very high stresses and temperatures the assembly will protect itself against creep-rupture type failure by the phenomenon of relaxation, i.e., the characteristic by which plastic flow of the material caused by stress at high temperature tends to reduce the stress and thereby reduce the rate of plastic flow.

Although this torsion tube seal embodies the advantageous characteristic of flexible metallic bellows insofar as the provision of a continuous wall zero-leakage seal is concerned, it has advantages over such bellows due to its simplicity of construction and arrangement and the fact that it provides a comparable seal between relatively rotatable parts (shaft and bonnet) whereas a bellows is usually considered to function properly only by compression and expansion linearly of its axis and hence would be poorly adapted to the installation herein disclosed.

Moreover, metallic bellows are subject to certain rather serious practical limitations. It is difficult to evaluate operating stresses because of the thin walls and intricate configuration. The stress range for most useful applications is such that fatigue failure will eventually occur after some approximately predictable number of cycles.

As fluid pressures and temperatures are increased, the bellows designer faces an inexhorable dilemma. He must increase metal thickness to contain the higher fluid pressure with lower stresses (because of temperature). But such increased wall thickness seriously reduces the flexibility or, conversely, increases the stress for a given amount of strain (deflection of the bellows).

In the most efficiently designed bellows it is necessary to make a seam weld at the inside diameter and also at the outside diameter of each convolution. This is a costly process, and requires the application of the ultimate in welding and inspection techniques. Because of the thin walls and intricate shapes, furthermore, extreme care must be exercised to protect a bellows assembly against physical damage. Even the slightest dent can be a point of stress concentration and subsequent premature failure.

This same intricacy of shape has a further disadvantage in that complete drainage of internal fluid may be difficult, depending upon the specific configuration and the position of the axis of the bellows.

The torsion tube sealing means of this invention require careful design and fabrication since, to realize an economic proportion, reasonably high stresses must be used. Unlike the bellows, however, these stresses are easily and accurately calculated. Furthermore, unlike the bellows, increasing the wall thickness to accommodate higher pressures and temperatures has only a minor effect on flexibility.

Since flexing stresses are torsional shear, and in effect independent of fluid pressure stresses, the designer can decide what these stresses should be, independently, and establish design dimensions accordingly. A practical advantage of this is that for high temperature applications, where creep strength is the important design criterion, a high design stress can be used for the flexing component, (which is susceptible to the self-relaxing phenomenon described earlier) and a lower design stress can be applied to the fluid pressure component (for which relaxation cannot afford stress relief).

Obviously, in order that the zero-leakage characteristics of the device may be complete, the joint between its body and bonnet must be of zero-leakage type. To this end the joint includes a seal welded flange arrangement. Bolting means are provided to sustain the fluid pressure loading on the bonnet flange, and are so arranged as to furnish a modicum of resiliency whereby expansion and contraction of the bolted parts which result from both static and dynamic temperature variations can be accommodated without excessive stress variations in the bolting.

In recognition of the extreme seriousness of the consequences of any failure in the coolant containment system of a nuclear reactor, specifications for components may call for a secondary seal enclosure capable of preventing the escape of coolant to the environment in the event of a rupture of the primary seal system, in this case the torque tube seal assembly. As in the case of the primary seal, the actuating shaft must penetrate this enclosure in order for the device to be and remain operative. The invention contemplates provision of an extension of the vessel and shaft, with appropriate provision for the dissipation of heat to assure metal temperatures substantially below the freezing point of the liquid metal. This feature, in conjunction with reduction of clearances through which the fluid must pass to escape from the containment, constitute what is appropriately called a "freeze seal," which is considered to satisfy the need for secondary seal protection. An additional practical requirement for such components is that it is necessary to vent the gaseous contents of the vessel when it is being filled with liquid sodium. For this purpose small clearance openings are provided, communicating with the uppermost points in which such gaseous contents may otherwise be trapped, and located in the same controlled temperature zone as described above to provide for freeze seal prevention of escape of liquid metal through the vents after the vessel has filled.

In view of the fact that a throttling rather than an on-off flow control of the device is desired, it is to be noted that the fluid flow control element does not provide for port sealing but rather a port covering control element positioned centrally in the body by its guide bearings. It is deemed advantageous in relation to the problems of thermal stresses and distortions to provide for the maximum possible uniformity of temperature distribution throughout the main portion of the device, pursuant to which objective means are provided for circulation of the coolant above the top plate and below the bottom plate of the rotatable control element, and connective flow apertures are provided between the interiors of the body and bonnet.

The object of the invention will, it is believed, be apparent from the foregoing, and although the disclosure of the invention hereinbefore and hereinafter presented is directed essentially to the device in its function as a control for the flow of coolant in a nuclear reactor power plant, it also relates to similar devices of more general application as has already been indicated.

Broadly considered, the invention comprises a flow control device in the nature of a valve having a body and bonnet in relatively open communication, the body being provided with ports and a rotatable fluid flow control element for controlling flow of fluid through such ports, an operating shaft or stem for the fluid flow control element extending axially of the bonnet and partially confined therein, whereby by rotary motion the fluid flow control element may be angularly adjusted in relation to said ports, and sealing means extending longitudinally of said shaft or stem and connected therewith and with said bonnet to provide a fluid seal therebetween, said sealing means comprising torsion tube means embracing said shaft or stem and elastically distortable in response to rotary motion of said shaft or stem relative to said bonnet, and the invention includes also various details of construction and arrangements of parts including secondary freeze sealing means and venting means; and the invention comprises, also, various structural and operational refinements, as will hereinafter be explained.

In the accompanying drawings illustrating the invention, in the several figures of which like parts are similarly designated.

FIG. 1 is a side elevation of the device of the invention,

FIG. 2 is an enlarged fragmentary vertical sectional elevation of the body and associated elements of the device taken on the line 2—2 of FIG. 3, FIG. 3 is an enlarged fragmentary sectional plan of certain of the parts shown in FIG. 2, taken on the line 3—3 of FIGS. 1 and 2, FIG. 4 is a sectional top plan view of the body of the device with a portion of the body wall shown in section taken on the line 4—4 of FIG. 2, FIG. 5 is a perspective view of the fluid flow control element of the device, FIG. 6 is an axial sectional elevation, to the scale of FIGS. 2 to 5, of the upper portion of the bonnet and operating stem or shaft, and the secondary sealing means, this section being taken on the line 6—6 of FIG. 7, FIG. 7 is a transverse section of the secondary sealing means taken on the line 7—7 of FIG. 6, FIG. 8 is a further enlarged axial sectional elevation of portions of the bonnet, secondary sealing means, and operating shaft or stem and torsion tube sealing means, and showing the vent means for the interior of the bonnet and the space between the inner torsion tube and the operating shaft, respectively.

FIG. 9 is a fragmentary view, to the scale of FIG. 8, showing the exit end of one of the bonnet vent means, FIGS. 10 and 11 are developments of preferred forms of openings to provide outlet ports in the body walls, FIG. 12 is a view similar to FIG. 6, but showing modifications of the torsion tube sealing means, shaft bearings and secondary sealing means, FIG. 13 is a fragmentary axial sectional elevation showing a further modification in which the torsion tube sealing means may embody an odd number of tubes rather than an even number thereof, and FIG. 14 is a schematic view of a typical nuclear reactor power plant with the coolant flow control valve of the invention installed in the piping thereof in appropriate locations.

Having reference particularly to FIGS. 1 to 5, inclusive, it will be seen that in the optional, but preferred, embodiment shown, the body of the flow control device of the invention comprises a cylindrical housing 1 provided with an inlet port 2 connected through a conduit 3 with a coupling element 4, and two outlet ports 5 and 6 aligned diametrically of the housing and in communication with streamlined passages 7 and 8, respectively, which merge, around a flow director structure 9—9, to provide an outlet conduit 10 connected with a coupling element 11. The lower end of the cylindrical housing 1 is closed by a bottom plate 12. All of these elements may be formed from metal plates suitably shaped and welded into a leak-proof pressure vessel.

The actual configuration of the body of the device makes it possible to drain all of the contained fluid through one or the other of the pipe ends at 4 and 11. Referring to FIGS. 1 and 2, it can be seen that there is no "pocket" in the body lower than the bottom of an adjacent pipe, nor is there any obstruction (considering the drain holes 1a and 1b, FIGS. 2 and 3, as serving the central cavity of the housing 1) to fluid draining from one end of the device through the other.

The upper end of the cylindrical housing 1 is closed by a bonnet flange 13 having a stepped bearing seat 14 in such upper end and seal-welded as indicated at 15 (FIGS. 2 and 4).

Within the housing 1, and capable of rotary motion therein, is the fluid flow control element comprising an upper circular plate 16, a lower circular plate 17, and port control or gate elements 18 and 19, complemental to the outlet ports 5 and 6, diametrically opposite each other and having their outer faces corresponding in curvature to the peripheries of the upper and lower plates 16 and 17 and joined thereto. These gate elements 18 and 19 are mutually supported by a diametrically arranged strut 20 (FIGS. 2, 3 and 5).

It will be noted (FIGS. 2, 3 and 4) that the radius of the plates 16 and 17 is just sufficiently less than that of the interior of the housing 1 to provide minor rotational clearance and that, therefore, the fluid flow control element although capable of throttling flow of fluid from the inlet port 2 through the outlet ports 5 and 6 will not serve to completely close these outlet ports. Hence, this fluid flow control element may be said to float in operative rotary, throttling, relation to the ports 2, 5 and 6 of the housing 1, and it is thus supported by an upper bearing 21 carried in an axial extension 22 of the bonnet flange 13 and a lower bearing 23 mounted upon a stud 24 affixed to the bottom plate 12 of the housing.

Rotary movement of the fluid flow control element is controlled by a shaft or stem 25 secured to it by a socket element 26 affixed to its top plate 16.

With reference particularly to FIGS. 2 and 3, it will be seen that the rotary fluid flow control element is of open, cage-like, form, and that its interior and the surrounding wall of the housing 1 are at all times in communication with the fluid entering at the inlet port 2. Moreover, its top and bottom plates 16 and 17 are provided with apertures 27 which serve to permit circulation of the controlled fluid within the housing around the fluid flow control element. Furthermore, the stud 24 of the lower bearing means is provided with an axial bore 28 in communication with an opening 29 in the bearing member 23, and is furnished with a radial hole 30 for communication of the axial bore 28 with the space between the bottom plate 12 of the housing and the lower plate 17 of the fluid flow control element. Thus, this stud 24 is exposed to free circulation of the controlled fluid, thereby assuring substantial equalization of the temperature of the stud and adjacent parts to minimize the effects of non-uniform temperature distribution.

Reverting to the control of coolant flow in the loops of nuclear reactor power plants for which the control device of the invention is particularly well adapted, it will be appreciated that since the pumping required in the coolant loops represents a parasitic operating cost, it is important to minimize pressure drop through this control device when it is in the open position. To achieve low pressure drop it must be assumed that the control port opening must be kept comparatively large. This in turn requires that the opening and closing means must be capable of covering and uncovering a large opening, and therefore it must have a relatively large movement. In the device of the invention this large movement is achieved by virtue of the relatively large diameter of the fluid flow control element whereby a slight angular motion at the hub results in a relatively large peripheral travel. Additionally, the total area opened and closed is doubled by virtue of the fact that two ports are used simultaneously.

A most important operating characteristic is the balancing of hydrostatic fluid forces. Note in FIG. 3 that fluid pressure exerted against the inner faces of the gate elements 18 and 19 of the fluid flow control element is always equal and opposite. In intermediate control positions this balanced condition can also be shown. As a consequence, the force or energy required to move the control element will always be relatively small.

For direct comparison, consider a gate or globe type valve with a comparable port opening. The unbalanced force on the closure element is the product of the differential fluid pressure and the port opening area, which in one typical example studied would amount to 28,000 lbs. Compounding the importance of this is the fact that the line fluid used in most nuclear power applications has virtually no lubricating properties of its own, and will not tolerate the presence of any conventional bearings or lubricating means, particularly at the elevated temperatures contemplated (e.g. 1200° F.).

The geometry of the flow control element is subject to certain limitations, indicated as in FIG. 3. In the embodiment shown, the openings of the outlet ports 5 and 6 cannot exceed 60° subtended angle, since one closure or gate element 18 and the inlet port 2 must share the angular space between the upstream edges of these outlet ports (see broken lines, FIG. 3), and the ports must be symmetrical about a diameter. However, the subtended angle of the openings can, of course, be any value less than 60° if desired.

The configuration shown is designed to minimize pressure drop, the importance of which has already been discussed. The inlet port may have an area somewhat larger than the pipe flow area in order to reduce the fluid velocity approaching the unavoidable turbulence at the control element. Pressure drop in any turbulence is proportional to the velocity head, which is related to the square of the velocity. Thus if the velocity is reduced by 50%, the pressure drop will be reduced by approximately 75%, other flow conditions remaining constant.

The reduction in velocity in the inlet, plus the careful fairing of the outlet ports to assure efficient recovery of fluid velocity in the outlet, assures a low pressure drop consistent with the economic consideration of power plant operation.

Referring to FIGS. 2, 10 and 11 it will be seen that three conformations for the outlet ports 5 and 6 are shown. In FIG. 2, the broken lines show the outlet port 5, which is representative of both ports, as substantially rectangular, whereas FIGS. 10 and 11 show, respectively, port conformations 5a and 5b; the conformation 5a providing for substantially linear flow control over the entire open to closed range, and the conformation 5b representing a compromise contour to provide good flow control near the closed position and minimum pressure drop in the full open position.

It is characteristic of flow control devices in general that flow is more sensitive to movement of the throttling element near the closed position than it is near the full open position. This is to say, for example, that the first 5% of opening movement might result in 20% of maximum flow, while the last 5% of movement might increase flow by only 1%.

This responsiveness can be made more nearly linear by providing that the first opening movement will cause a substantially smaller increase in flow port area opening, and the last movement will cause the largest increase in flow port area opening. Hence, in FIGS. 10 and 11, the right-hand side of the two developed contours 5a and 5b shown would be the first part of the port to open and, obviously, with the reduced area of opening at that point the control would be biased as desired.

It will be noted, furthermore, that the clearance provided by the difference in diameter of the plates 16 and 17 of the control element and the inner cylindrical wall of the housing 1, and the fact that the control element is rotatively supported solely by the small diameter bearings 21 and 24 at its opposite axial ends, make possible substantially friction-free rotation of the control element, whereby it may be accurately positioned at low torque for accurate control of fluid flow.

Referring further to FIGS. 1, 2 and 4, it will be seen that the seal weld of the bonnet flange 13 to the housing 1 of the body is not intended to sustain the outward force of the fluid pressure on the bonnet flange in the presence of the high temperatures and pressures under which the device is designed to operate. This pressure force load is rather carried by a centrally apertured holddown or pressure disc 31 of a moderately resilient nature spaced from but bearing upon the bonnet flange 13 on an annular rib 32 (FIG. 2) formed on its lower face. This pressure disc 31 is secured in operative position by an annular series of bolts 33 the heads of which engage the upper ends of sleeves 34 seated in locating sockets 35 in the disc 31. The lower threaded ends of the bolts pass through complemental bores 36 in a slip ring 37 keyed to the housing 1 against axial movement thereon by a key ring 38, and are adjustably secured by nuts 39.

It will be seen that the bolts are of considerable length and are provided with portions of reduced diameter (see left of FIG. 2). Thus, although they may be so tightened as to distort the disc 31 sufficiently on the fulcrum provided by the rib 32 to impose the desired load upon the bonnet flange 13 they will be relatively insensitive to bending and thermal stresses and their portions of reduced diameter assure that any combination of stress and temperature which might otherwise cause distress in the bolts will be relieved by the natural phenomenon of stress relaxation, as is well understood by engineers in the high temperature steam turbine and gas turbine fields.

The bonnet 40, FIGS. 1, 2, 4, 6 and 8, which, with the bonnet flange 13, may be considered, broadly, as an element of the body structure, comprises a tube of an axial length sufficient to house the major axial extent of the operating stem or shaft 25 and enclose, and provide a mounting means for, the zero-leakage seal means which are associated with such stem or shaft. The lower end of this bonnet tube 40 is welded, as indicated at 41, to the upper face of the bonnet plate 13 (FIG. 8) and its interior is in open communication with the interior, or valve chamber, of the housing 1 through a central opening 42 in the bonnet flange 13 and apertures 43 in the axial extension 22 which supports the bearing 21 of the fluid flow control element.

As shown particularly in FIG. 8, the zero-leakage sealing means associated with the stem or shaft 25 and bonnet 40 comprises, preferably, two torsion tubes, an inner tube 44 and an outer tube 45. The inner tube 44 embraces the stem or shaft 25 and is spaced radially therefrom, and the outer tube 45 is telescoped upon the the inner tube in radially spaced relation. The upper end of the inner tube 44 is welded at 46 to the shaft 25 and its lower end is welded at 47 to the lower end of the outer tube 45. The upper end of the outer tube 45 terminates in a flared flange 48 which is welded at 49 to a circumferential lip 50 which extends inwardly from the wall of the bonnet 40.

By virtue of this assembly it will be apparent that fluid confined within the body of the device, including the bonnet 40, and surrounding the shaft 25, cannot escape around the shaft, while at the same time rotary movement can be imparted to the shaft due to the torsional twist which may be imposed upon the torsion tubes 44 and 45 of the sealing means.

Although the sealing means comprising only two torsion tubes, as shown in FIG. 8, is considered preferable due to its simplicity and the facility with which it may be assembled, particularly in installations where, due to the desirability of maintaining uniformity of temperature over the full length of the seal elements, it is preferable to have a fluid annulus of substantial cross section surrounding substantially the full length of the seal, a greater even number, or an odd number, of torsion tubes may be employed to produce the sealing means, as indicated, for example, in FIG. 12 where four tubes are shown, or in FIG. 13 where three tubes will suffice. It is to be understood, however, that embodiment of the sealing means of the invention in these three disclosed assemblies is not to be taken as representing a limitation of the scope of its adaptability.

As hereinbefore pointed out, since torsional rigidity is proportional to diameter, the flexibility of the outer tube will be less than that of the inner tubes. However, the stresses in all tubes can be approximately equalized by making the wall thicknesses inversely proportional to mean diameter, a representative illustration of which is given in FIGS. 8, 12 and 13. This has the advantage, assuming uniform temperature throughout, of assuring that at very high stresses and temperatures the assembly will protect itself against creep-rupture type failure by the phenomenon of relaxation, i.e., the characteristic by which plastic flow of the material caused by stress tends to reduce the stress and thereby reduce the rate of plastic flow.

Obviously, the telescoped arrangement of tubes permits the length of the assembly to be shortened for a given angular deflection (stress) and inner shaft diameter. Also, the torsional rigidity of the inner shaft is increased in direct proportion to the reduction in its length.

In the event of failure of the zero-leakage torsion tube sealing means it is necessary to provide means for preventing escape of the controlled fluid around the stem or shaft 25. This is of particular importance in installations such as nuclear reactor power plants using liquid metal as a coolant, but the fact that liquid metal coolants characteristically have moderate solidification (freezing) temperatures, (208° F. for liquid sodium), makes it possible to provide for a secondary sealing means based on controlling the local temperature of the assembly below this freezing point.

To this end, having reference to FIGS. 6 to 9, it will be seen that where the shaft or stem 25 extends above the end of the bonnet 40 it is provided with an extension 51 joined to it by a weld 52, and this extension passes, with a slight clearance, through the axial bore 53 of a cooling element 54 provided with heat dissipating fins 55 and joined to the bonnet 40 by a weld 56.

Thus, should the fluid make its way past the seal provided by the torsion tube sealing means and enter the clearance space between the shaft extension 51 and the wall of the bore 53 of the cooling element 54, the effect of this cooling element will be to solidify the fluid in this clearance space, thus arresting its travel therethrough. Although this solidification of the fluid will cause the shaft extension 51 to freeze in the bore 53 of the cooling element the shaft extension may readily be freed by application to it of the slightly increased torque necessary to overcome the relatively low shear strength of the solidified liquid metal.

In FIG. 12 there is shown another expedient to meet such primary seal failure. As there shown, the shaft extension 51' passes, with clearance, through the bore 53' of a cooling chamber 57 formed in the upper portion of a bonnet extension 58 which, in its lower portion, provides a space 59 for the reception of fluid escaping past the zero-leakage sealing means. A suitable coolant may be circulated in the cooling chamber 57 by way of an inlet pipe 60 and an outlet pipe 61, the flow through the inlet pipe being controlled by a valve 62 actuated in response to the functioning of a thermostat 63 associated with the space 59 in the presence of fluid within such space.

As shown in FIGS. 6 to 9, the device is provided with further structural refinements to meet anticipated conditions of operation. Namely, where the space within the bonnet 40 is in relatively open communication with the body and will receive the fluid being controlled, it is desirable, for proper functioning of the zero-leakage torsion tube sealing means, that air and gas which may be present in such space be vented therefrom and this necessitates venting not only the air or gas in the space between the outer torsion tube 45 and the bonnet wall but also that which may be trapped between the shaft 25 and the inner torsion tube 44.

To this end the bonnet is provided at its upper end, preferably in the body of the circumferential lip 50, with communicating bores 64 and 65 leading to a vent pipe 66 which passes through a tube 67, FIGS. 6 and 9, extending upwardly between fins 55 of the cooling element 54. The vent pipe 66 emerges from the upper end of this tube 67 and is provided with a filler rod 68, FIG. 9, extending for a considerable distance downwardly therein, this rod having an offset handle end 69 by which it may be manipulated.

The shaft 25 is provided, below the location of the weld 46 at the upper end of the inner torsion tube 44, with an annular groove 70 communicating through one or more radial bores 71 with an axial vent duct 72 in the shaft 25 and its extension 51, and the extension 51 is provided with a counterbore 73 in communication with the vent duct 72 and furnished with a filler bar 74 provided at its upper end with offset means 75, FIG. 6, whereby it may be manipulated.

It will be seen that the bore 64 opens into the space between the flanged end of the outer torsion tube 45 and the circumferential inner edge of the lip 50, and that the radial bore 71 communicates through the circumferential groove 70 of the shaft 25 with the upper extremity of the clearance space between this shaft and the inner torsion tube 44. Thus, these two spaces may be vented of air or gas through the venting means 64, 65, 66 and 70, 71, 72, 73, respectively. However, when the controlled fluid flows into these venting means, both of which pass through zones of sub liquid-metal-freezing temperatures maintained by virtue of the cooling finned construction 55, it will encounter, due to the constriction caused therein by the rod 68 and filler bar 74, respectively, such confined passages as will cause it to solidify, thus arresting its flow. When necessary, the venting means may be cleared of such obstruction by proper manipulation of the rod 68 and bar 74, as will be apparent.

In the modification illustrated in FIG. 13, wherein a three tube zero-leakage sealing means is provided, it will be noted that the outer torsion tube 76 has its flanged end at the bottom and connected to a circumferential lip 77. This arrangement will be suitable where relatively cool fluids are controlled and it is not essential that the sealing means be surrounded by the controlled fluid as in the other embodiments disclosed.

Again referring to the use of the device of the invention in its function of controlling the flow of liquid metal as a coolant, or heat transferring medium, in a nuclear reactor power plant, FIG. 14 illustrates, in schematic form, a typical power plant of this type in which A is the nuclear reactor, B is an intermediate heat exchanger, C is the primary liquid metal pump, D is the secondary liquid metal pump, E is the boiler, F is the steam turbine generator, G is the condenser, and H is the condensate (water) pump.

Appropriate locations in the system of this typical plant in which the flow control device of the invention will normally most effectively function are in the pipe line I between the primary liquid metal pump C and the reactor A, and in the pipe line J between the secondary liquid metal pump D and the intermediate heat exchanger B, for it is in the reactor A and intermediate heat exchanger B that operating temperatures are so critical as to require the most efficient control of circulation of the liquid metal as a coolant, it being understood, also, that the circulation of liquid metal by the secondary liquid metal pump D between and through the intermediate heat exchanger B and boiler E serves to generate steam for operation of the turbines of the turbine generator F. Flow control valves K and L embodying the features of the invention are shown as installed in these pipe lines I and J, respectively.

It will be noted that each of the valves K and L of the invention is provided with an automatic and manual control, as indicated by the legend on the drawing (FIG. 14). The automatic means of these control devices for the valves K and L will be activated by appropriate sensing and/or anticipatory signal inputs to achieve the desired operating continuity.

The manual control means may be employed when desired, being arranged to override or substitute for automatic operation.

Obviously, as long as the plant is in operation there must be flow of the coolant, and the control device of the invention will meet this requirement adequately by reason of the fact that flow through it is never completely arrested; the flow is merely effectively throttled.

Various changes and modifications are considered to be within the principle of the invention and the scope of the following claim.

What I claim is:

In a fluid flow control device, a body having a fluid inlet and a fluid outlet with their fluid flow axes in substantially the same plane and in substantial alignment with the longitudinal axis of said body, a cylindrical housing arranged within said body with its axis substantially perpendicular to said plane and having an inlet opening communicating with said fluid inlet and a pair of outlet ports diametrically oppositely disposed transversely of and diagonally with respect to said longitudinal axis and communicating through said body with said fluid outlet, a rotary fluid flow control element having axial bearings in said body and being confined within said housing axially thereof, the outside diameter of said control element being less than the inside diameter of said housing to thus avoid rotational contact between the control element and housing, said control element having an open interior in communication with said fluid inlet to permit flow of the controlled fluid within the control element and housing at all times and being provided with a pair of diametrically oppositely disposed gate elements for simultaneous fluid flow control cooperation with said outlet ports, the diagonal arrangement of said outlet ports serving to provide an area of the wall of said cylindrical housing adjacent to said inlet opening to accommodate one of said gate elements in open position, and means for imparting limited rotary motion to said control element whereby when said control element is rotated to move said gate elements into position to close said outlet ports the flow of fluid will be substantially arrested and will maintain the open interior of the control element filled, and when the gate elements are moved into position to open said outlet ports the fluid flow through said interior and through said ports will be unobstructed, the device thereby being adapted to function as a throttling valve rather than an on-off valve, with total avoidance of contact of the control element with the body and housing except at said bearings, to thereby prevent any friction between the control element and the body and housing from interfering with low torque imposed on said motion imparting means to rotate the control element.

References Cited in the file of this patent

UNITED STATES PATENTS

| | | |
|---|---|---|
| 329,650 | Jackson | Nov. 3, 1885 |
| 904,855 | Enrico | Nov. 24, 1908 |
| 2,328,857 | Stone | Sept. 7, 1943 |
| 2,574,428 | Wheatley | Nov. 6, 1951 |
| 2,626,124 | McCarthy | Jan. 20, 1953 |
| 2,768,806 | Koehler | Oct. 30, 1956 |
| 2,811,347 | Cass | Oct. 29, 1957 |
| 2,820,470 | Sanders | Jan. 21, 1958 |
| 2,842,970 | Quiroz | July 15, 1958 |
| 2,867,841 | Baldauf | Jan. 13, 1959 |

FOREIGN PATENTS

| | | |
|---|---|---|
| 149,687 | Australia | Jan. 19, 1953 |
| 253,079 | Switzerland | Nov. 1, 1948 |
| 399,217 | Germany | July 21, 1924 |

OTHER REFERENCES

United Nations Publication, 1955, entitled "Proceedings of the International Conference on Peaceful Uses of Atomic Energy," volume 3, pages 312 and 313, copy in Div. 46 and Scientific Library.